6 Sheets—Sheet 1.

G. WARNER,

Assignor to C. H. & L. J. McCormick.

Grain-Binder.

No. 8,513. Reissued Dec. 3, 1878.

WITNESSES

C. Clarence Poole

Wm A. Shinkle

INVENTOR

George Warner

By his Attorneys

Baldwin Hopkins & Peyton

6 Sheets—Sheet 2.

G. WARNER,

Assignor to C. H. & L. J. McCormick.

Grain-Binder.

No. 8,513. Reissued Dec. 3, 1878.

WITNESSES

C. Clarence Poole

Wm A. Finkle

INVENTOR

George Warner

By his Attorneys

Baldwin, Hopkins & Peyton

G. WARNER,

Assignor to C. H. & L. J. McCORMICK.

Grain-Binder.

No. 8,513. Reissued Dec. 3, 1878.

WITNESSES

Clarence Poole

Wm A Shinkle

INVENTOR

George Warner

By his Attorneys

Baldwin, Hopkins & Peyton

G. WARNER,

Assignor to C. H. & L. J. McCORMICK.

Grain-Binder.

No. 8,513. Reissued Dec. 3, 1878.

WITNESSES

C. Clarence Poole

Wm A Skinkle

INVENTOR

George Warner

By his Attorneys

Baldwin, Hopkins & Peyton

G. WARNER,

Assignor to C. H. & L. J. McCormick.

Grain-Binder.

No. 8,513. Reissued Dec. 3, 1878.

WITNESSES

C. Clarence Poole

Wm A. Skinkle

INVENTOR

George Warner

By his Attorneys

Baldwin Hopkins & Peyton

G. WARNER,

Assignor to C. H. & L. J. McCormick.

Grain-Binder.

No. 8,513. Reissued Dec. 3, 1878.

WITNESSES

Wm A Pinkle

Geo W Breck

INVENTOR

George Warner.

By his Attorneys

Baldwin Hopkins & Peyton

UNITED STATES PATENT OFFICE.

GEORGE WARNER, OF WEST LIBERTY, IOWA, ASSIGNOR, BY MESNE ASSIGNMENTS, TO C. H. & L. J. McCORMICK, OF CHICAGO, ILLINOIS.

IMPROVEMENT IN GRAIN-BINDERS.

Specification forming part of Letters Patent No. 67,389, dated July 30, 1867; Reissue No. 8,513, dated December 3, 1878; application filed September 24, 1878.

*To all whom it may concern:*

Be it known that I, GEORGE WARNER, of West Liberty, in the county of Muscatine and State of Iowa, have invented a new and Improved Grain-Binding Attachment for Harvesters, of which I hereby declare the following to be a full, clear, and exact description, which will enable those skilled in the art to make and use the same, reference being had to the accompanying drawings, forming part of this specification, in which—

Figure 1:
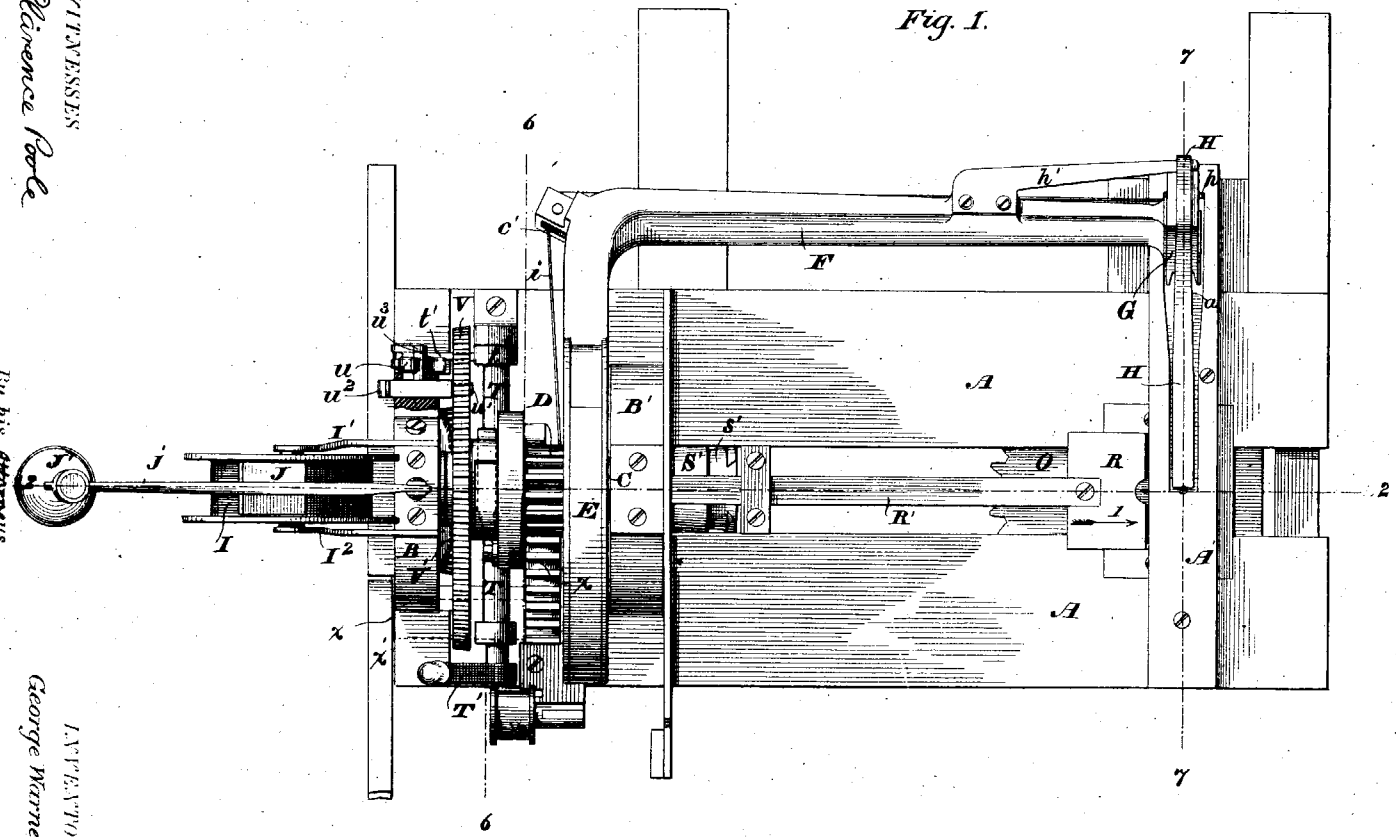
Figure 2:
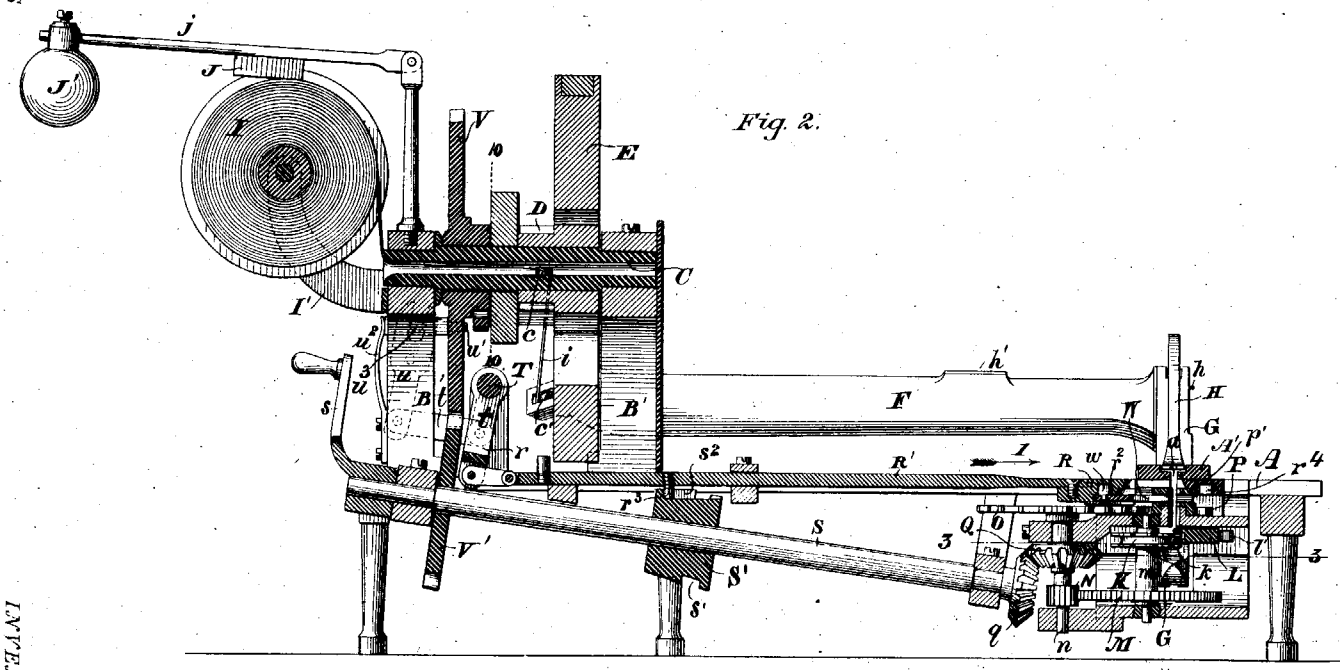
Figure 5:
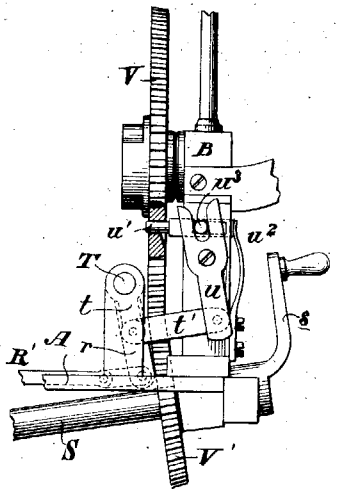
Figure 4:
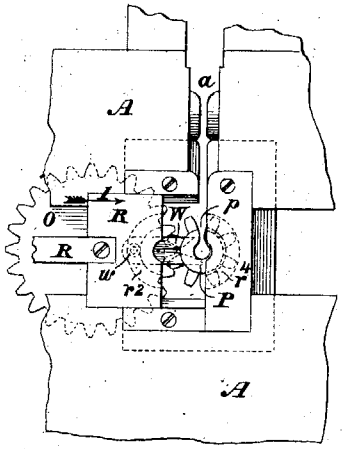
Figure 3:
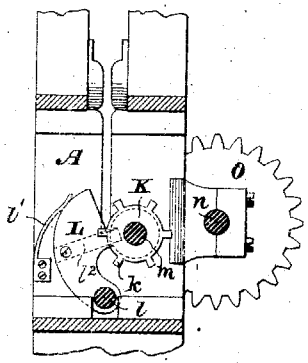
Figure 8:
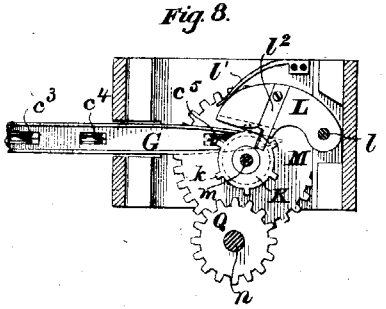
Figure 7:
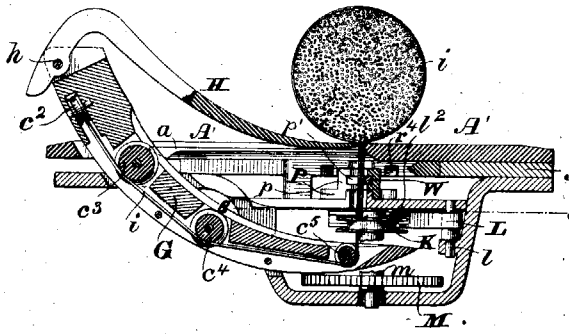
Figure 6:
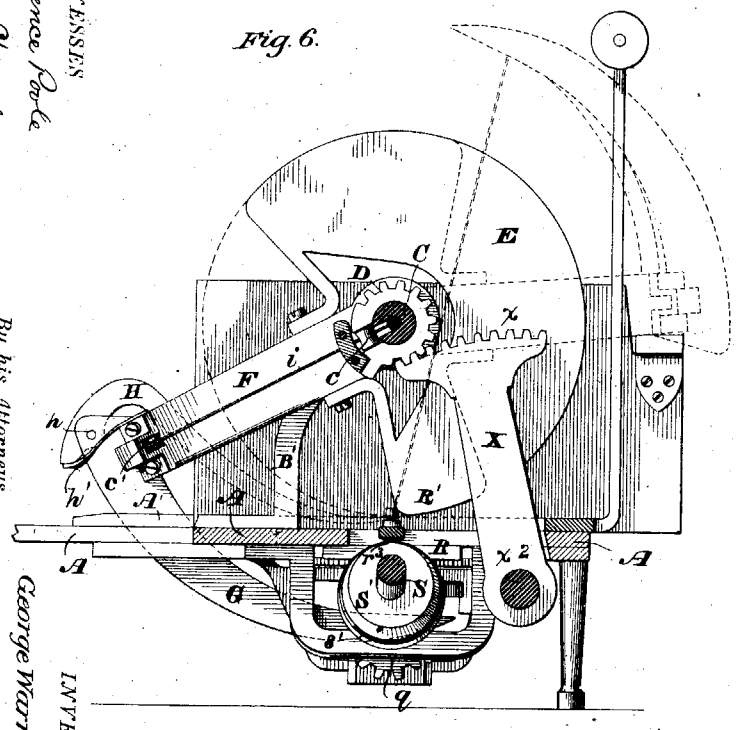
Figure 9:
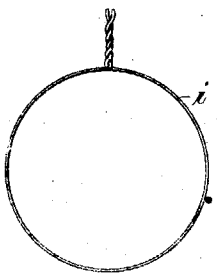
Figure 10:
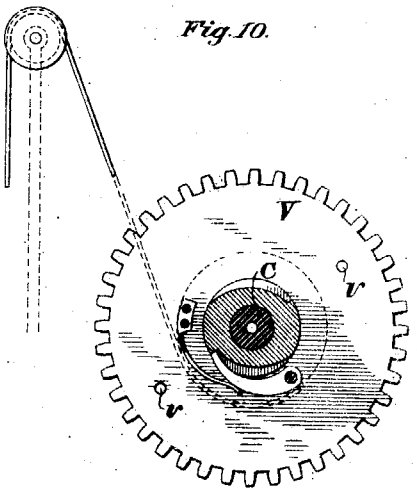
Figure 11:
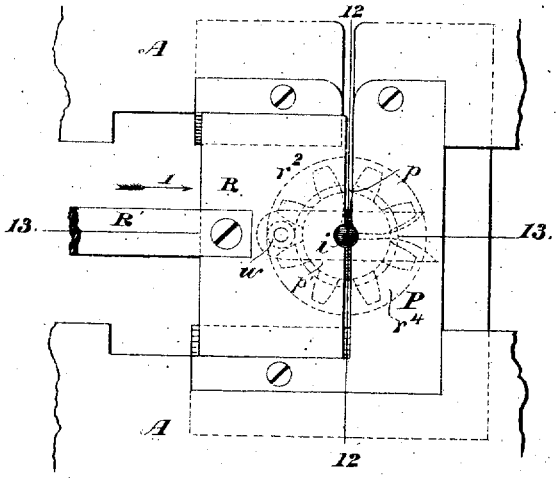
Figure 14:
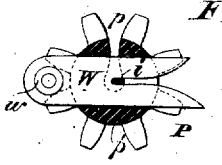
Figure 12:
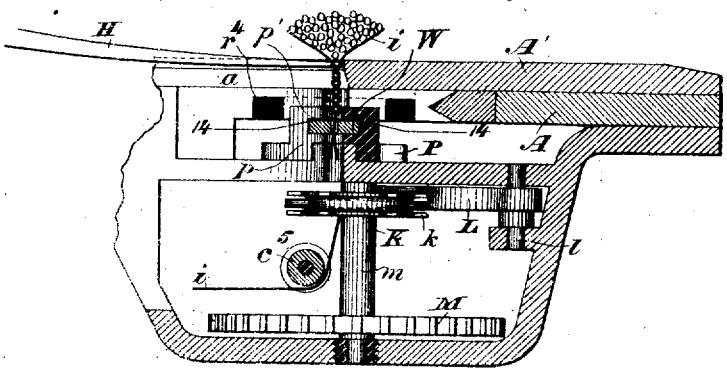
Figure 15:
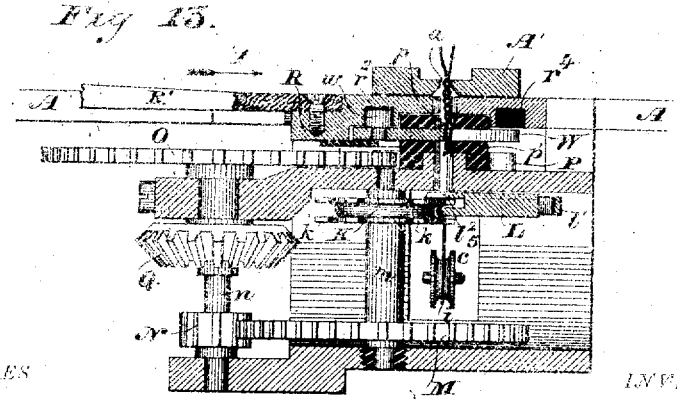

Figure 1 represents a plan or top view of so much of my improved grain-binding attachment as is necessary to illustrate the subject-matter herein claimed, with the binding-arm engaged with the cutting and twisting apparatus. Fig. 2 is a vertical longitudinal section through the same, taken on the line 2 2 of Fig. 1, with the parts in the position above mentioned. Fig. 3 is a longitudinal section through a portion of the same on the line 3 3 of Fig. 2, looking upward, showing the details of the wire clamping and cutting mechanism. Fig. 4 represents a plan or top view of some of the mechanism shown in the preceding figures. Fig. 5 represents a view in elevation of a portion of the opposite or gearing end of the apparatus, showing the side opposite to that represented in Fig. 2. Fig. 6 represents a vertical transverse section through the apparatus on the line 6 6 of Fig. 1, looking toward the binder-head. Fig. 7 represents a vertical transverse section on the line 7 7 of Fig. 1, showing the details of the wire carrying and twisting mechanism; Fig. 8, a horizontal section of a portion of the same on the line 8 8 of Fig. 7, looking downward. Fig. 9 is a view of the wire band formed by the mechanism above described; Fig. 10, a detail view of the stop-wheel or locking-gear. Fig. 11 represents a plan view of the twisting mechanism, (similar to Fig. 4,) with the clamping-slide closed on the twister; Fig. 12, a view (similar to Fig. 7) in section on the line 12 12 of Fig. 11; Fig. 13, a view (similar to part of Fig. 2) on the line 13 13 of Fig. 11, and Fig. 14 a plan view of the clamping-slide and twister.

The last four preceding figures are drawn on an enlarged scale to show the details more clearly.

My invention relates to that class of grain-binding attachments for harvesters in which binding-wire fed from a reel or spool, through or over a binding-arm, is carried around the gavel, twisted, and severed by suitable mechanism.

The first part of my invention relates to the devices for carrying the wire around the gavel to insure its proper delivery to the twisting mechanism, which end I attain by combining with a binding-arm passing on one side of the twisting mechanism a supplementary finger, tucker, or guiding-arm, acting on the opposite side to insure the accurate relation of the wire to the twister.

The next part of my invention relates to the method of placing, holding, and cutting the wire. Its object is to hold the wire securely while being cut, which end I attain by combining a wire-forcing wheel, a wire-holder, and a cutting-knife, as hereinafter more fully explained.

The next part of my invention relates to the method of clamping (or holding) and twisting the wire. Its object is to secure the wire when inserted into the twister by a nipping or clamping action, which ends I attain by combining a twister-wheel with a clamping-slide, as hereinafter more fully explained.

The subject-matter claimed is hereinafter specifically stated.

In the accompanying drawings, the platform A is shown as adapted to be so placed on a reaper or harvester that it may receive the grain as it is cut.

A frame composed of two semicircular bars, B B′, placed on the platform, supports a tubular shaft, C, on which is mounted a toothed segment, D, and a semicircular counterpoise, E, upon which latter is secured a crank-shaped or right-angular bar, F, carrying a binding or wire-carrying arm, G, at its outer end.

A finger, tucker, or supplementary arm, H, is secured to the rear end of the binding-arm, above mentioned, by a pivot, *h*, and is provided with a spring, *h′*, Figs. 1 and 6, attached to the overhanging bar F, and bearing against the rear end of the finger, which spring tends to keep the front or outer end of said finger in contact with the outer part of the binding-arm G, or, in other words, to keep the two closed together.

The binding-arm G, bar F, and the tubular shaft C are respectively provided with sheaves $c$ $c^1$ $c^2$ $c^3$ $c^4$ $c^5$, to serve as guides for the binding-wire $i$, which extends from spool I, fitted between arms $I^1$ $I^2$, attached to one of the frame-bars B, which support the tubular shaft.

A brake, J, rests upon the wire of the spool, and prevents it from casually turning. This brake is secured upon an arm, $j$, pivoted upon the frame, and provided with an adjustable counterpoise-weight, J′, to regulate its pressure upon the wire-spool.

Underneath the platform is placed a wire clamping, griping, or nipping device, composed of a wheel, K, having radial arms or teeth $k$ projecting from its periphery in two parallel rows, one above the other, thus leaving an intermediate groove to receive a wire-holder, L, rocking on a pin, $l$, and having a spring, $l'$, bearing against it, as clearly shown in Figs. 3, 8, and 12. The wheel K, which I call a "wire-forcing" or "wire-placing" wheel, is mounted on a vertical shaft, $m$, having a toothed wheel, M, on its lower end, into which wheel a pinion, N, on a vertical shaft, $n$, gears, said shaft $n$ having a toothed wheel, O, on its upper end, which gears into a twister-wheel, P, having a radial slot, $p$, therein to receive the binding-wire. The shaft $n$ also carries a bevel-wheel, Q, gearing into a corresponding wheel, $q$, on an inclined driving-shaft, S, underneath the platform, provided with a crank, $s$, on its outer end.

A plate, A′, secured upon the platform parallel with the wire-carrying arm G, is provided with a slot, $a$, for the passage of the binding-wire, a corresponding slot being likewise made in the platform beneath for the same purpose.

A slide, R, reciprocates between proper guides on the platform, being actuated by means of a slide-bar or pitman-rod, R′, the other end of which is linked to the lower end of an arm or radius-bar, $r$, on a rock-shaft, T, having a lever, T′, at one end thereof. This rock-shaft T also carries another pendent arm or radius-bar, $t$, at its front end. The lower end of this arm is connected by a link, $t'$, with the lower end of a rocking lever, $u$, forked or slotted at its upper end to embrace a pin, $u^3$, of a slide carrying a pin, $u^1$. The slide-pin $u^1$ is provided with a spring, $u^2$, bearing against its outer end, which spring has a tendency to keep the pin $u^1$ pressed against a toothed stop-wheel, V, mounted loosely on the tubular shaft C, above mentioned, and having a series of holes, $v$, made in it to receive the pin $u^1$. (See Fig. 10.)

The slide R has a semicircular slot, $r^2$, in its under side to receive a pin, $w$, of a forked lever or clamping-slide, W, which, when the slide R is shoved forward in the direction indicated by arrow 1, enters a slot in the neck or hub $p'$ of the slotted wheel P to clamp the wire. (See Figs. 11 to 14.)

The slide-bar R′ has a pin, $r^3$, projecting down from it, near its middle, which pin fits in a circumferential groove, $s^1$, in a hub, S′, on the shaft S, said hub having a longitudinal groove, $s^2$, made in it, which communicates with the other groove, (see Fig. 2,) by which means the twister-gears are locked, and thus kept from turning when the clamping-slide W is withdrawn from the twister.

The wheel V is connected with the shaft C by a pawl and ratchet, (see Fig. 10,) in order that the binding-arm may rotate while the wheel V is locked by its stop-pin. The driving-shaft S also carries a toothed wheel, V′, which gears into the wheel V on the tubular shaft C. The toothed segment D, hereinbefore mentioned, on the shaft C, gears into a toothed segment, $x$, of the arm X, rocking on a shaft, $x^2$, which has a lever, $x^1$, mounted upon it.

The operation is as follows: The wire $i$ passes from the spool I into the tubular shaft C, and is drawn through an opening in the side of the same and through the toothed segment D, and over the sheaves $c$ $c^1$ $c^2$ $c^3$ $c^4$ $c^5$, along the bar F, and in the wire-carrying arm G, and has its end drawn out from said arm near its forward end, as clearly shown in Fig. 7.

The bar F, which normally lies at the back of the platform, is moved forward or over to the front side of the same by actuating the lever $x^1$ through the intervention of the toothed segments D and $x$. This movement throws the binding-arm G under the platform and shoves the wire through the slot in the plate and platform into the slot of the twister-wheel P at the same time that the tucker or finger H abuts against a suitable guide, slides over the platform, and shoves the wire close under the gavel and into the slot of the twister.

The lever T′ of the rock-shaft T is now actuated so as to draw the pin $u^1$ out of the hole $v$ in the wheel V, the slide-bar R′ and its slide R being moved forward at the same time, so that the clamping-slide W will be shoved through the slot in the neck of the twister-wheel P to clamp the wire lying in the slot in said wheel. A still further rotation of the driving-shaft (which is now released by the forward movement of the locking-stud $r^3$, which thus passes out of the longitudinal groove $s^2$ into the circumferential one, $s^1$, of the hub on the shaft S) actuates the wire forcing or placing wheel K, the teeth of which carry the wire between the holder L and the wheel K, the holder firmly pressing the wire against said wheel at the same moment that the end of the wire above the holder is cut off by the knife $l^2$ on the upper side of said holder.

The driving-shaft S revolves until another one of the series of holes $v$ in the wheel V is brought in line with the slide-pin $u^1$, which latter is forced into the hole by its spring, which stops the rotation of the driving-shaft. The slide R and clamp W are then retracted, the twister-gearing being locked by the entrance of the stud $r^3$ into the slot $s^2$, as above mentioned.

The binding-arm and its supporting-bar F are now swung back over the platform to its rear side. The wire being held by its holder is drawn from the spool as the binding-arm swings backward and assumes the position shown in Fig. 6, leaving room for the deposit of the cut grain upon the platform in front of it.

The arm now again moves forward, carrying the wire around the gavel, and shoves it into the slot of the twister-wheel P under the platform, while the finger H does the like above.

The stop-pin $u^1$ is liberated from the wheel V, and the stud $r^3$ from the groove $s^2$, the clamping-slide W moves as before, and the driving-shaft is also turned. This turning of the driving-shaft S causes the twister-wheel P and clamping-slide W to rotate, (after said bar is shoved into the neck of the wheel P,) the pin $w$ in said bar working in and through the semicircular slots $r^2$ $r^4$, in consequence of said slots being concentric with the axis of the wheel P. (See Figs. 11 to 14.)

The rotation of the clamping-slide carries the wire against the knife, which cuts the wire, severing the band from above. The binding-arm may be then retracted, the bound sheaf removed, and the operation above described repeated when a sufficient quantity of cut grain has been deposited upon the platform.

Having thus described my invention, what I claim as new, and desire to secure by Letters Patent, is—

1. The combination, substantially as hereinbefore set forth, of a binding or wire-carrying arm with a supplementary hinged or pivoted finger or tucker to force the wire into the twister.

2. The combination, substantially as hereinbefore set forth, of a binding or wire-carrying arm, a supplementary hinged or pivoted finger or tucker pivoted thereon, and a spring to keep the tucker and wire-carrying arm normally in contact.

3. The combination, substantially as hereinbefore set forth, of a wire-carrying arm, a supplementary finger or tucker pivoted thereon, a spring which holds them normally in contact, and a separate guide which causes them to pass on opposite sides of the twister.

4. The combination, substantially as hereinbefore set forth, of the twister with the wire-carrying arm, acting on one side thereof, and the supplementary finger or tucker, (pivoted on the wire-carrying arm,) acting on the other.

5. The combination, substantially as hereinbefore set forth, of the wire-forcing wheel, the pivoted rocking wire-holder, and the cutting-knife mounted thereon and moving therewith.

6. The combination, substantially as hereinbefore set forth, of the twister-wheel, the wire-forcing wheel, the pivoted rocking wire-holder, and the cutting-knife carried thereby.

7. The combination, substantially as hereinbefore set forth, of the slotted intermittently-rotating twister with the clamping-slide movable therethrough and rotating therewith.

8. The combination, substantially as hereinbefore set forth, of the twister, its clamping-slide, the wire-forcing wheel, its holder, and the cutter on the holder.

GEORGE WARNER.

Witnesses:

CHRIS. HUTTENLOCHER,
CHAS. CALAHAN.